United States Patent
Yang et al.

(10) Patent No.: US 9,922,438 B2
(45) Date of Patent: Mar. 20, 2018

(54) METHOD AND APPARATUS FOR SWITCHING REAL-TIME IMAGE IN INSTANT MESSAGING

(71) Applicant: TENCENT TECHNOLOGY (SHENZHEN) COMPANY LIMITED, Shenzhen (CN)

(72) Inventors: Chongzhe Yang, Shenzhen (CN); Maoqing Fu, Shenzhen (CN); Yecheng Xian, Shenzhen (CN); Mengshi Liu, Shenzhen (CN); Guang Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/238,215

(22) Filed: Aug. 16, 2016

(65) Prior Publication Data

US 2016/0358361 A1    Dec. 8, 2016

Related U.S. Application Data

(63) Continuation of application No. PCT/CN2015/072155, filed on Feb. 3, 2015.

(30) Foreign Application Priority Data

Mar. 5, 2014    (CN) .......................... 2014 1 0079835

(51) Int. Cl.
*G06T 11/60*    (2006.01)
*H04N 1/00*    (2006.01)
(Continued)

(52) U.S. Cl.
CPC .......... *G06T 11/60* (2013.01); *G06F 3/04847* (2013.01); *G06F 3/04883* (2013.01);
(Continued)

(58) Field of Classification Search
CPC ... G06T 1/60; G06F 3/04847; G06F 3/04883; G06K 9/00671; H04L 51/046; H04L 51/043; H04L 51/10; H04N 1/00159
See application file for complete search history.

(56) References Cited

U.S. PATENT DOCUMENTS

| 2006/0148512 | A1 | 7/2006 | Ekholm et al. |
| 2010/0050092 | A1 | 2/2010 | Williams et al. |
| 2016/0127287 | A1* | 5/2016 | Oh ...................... H04L 12/1831 715/752 |

FOREIGN PATENT DOCUMENTS

| CN | 101753479 A | 6/2010 |
| EP | 2 854 428 A1 | 2/2013 |
| KR | 101331444 B1 | 11/2013 |

OTHER PUBLICATIONS

PCT International Search Report in related application PCT/CN2015/072155, dated May 6, 2015 (3 pgs).

(Continued)

*Primary Examiner* — Jwalant Amin
(74) *Attorney, Agent, or Firm* — Brinks Gilson & Lione

(57) ABSTRACT

A method and an apparatus for switching a real-time image in instant messaging are provided, where the method includes: providing a camera installed in the terminal; receiving a real-time image turn-on instruction inside an instant messaging window indicated on the terminal, and turning on the camera according to the real-time image turn-on instruction; receiving a real-time image acquired by the camera; and switching a background of the instant messaging window to the real-time image, the real-time image being placed behind a text of the instant messaging window.

17 Claims, 11 Drawing Sheets

(51) Int. Cl.
*G06F 3/0484* (2013.01)
*G06F 3/0488* (2013.01)
*G06K 9/00* (2006.01)
*H04L 12/58* (2006.01)

(52) U.S. Cl.
CPC ........ *G06K 9/00671* (2013.01); *H04L 51/046* (2013.01); *H04N 1/00159* (2013.01); *H04L 51/043* (2013.01); *H04L 51/10* (2013.01)

(56) References Cited

OTHER PUBLICATIONS

PCT Written Opinion in related application PCT/CN2015/072155, dated May 6, 2015 (5 pgs).

\* cited by examiner

METHOD AND APPARATUS FOR SWITCHING REAL-TIME IMAGE IN INSTANT MESSAGING

CROSS-REFERENCE TO RELATED APPLICATIONS

This application is a continuation of International Application No. PCT/CN2015/072155, filed on Feb. 3, 2015, which claims priority to Chinese Patent Application No. 201410079835.0, entitled "Method and Apparatus for Switching Real-time Image in Instant Messaging" filed on Mar. 5, 2014, both of which are incorporated by reference in their entirety.

FIELD OF THE TECHNOLOGY

The present disclosure relates to the field of Internet technologies, and in particular, to a method and an apparatus for switching a real-time image in instant messaging.

BACKGROUND

With the ongoing improvement of Internet technologies, people get more and more used to communication with relatives, friends, and colleagues through networks; especially, with the development of technologies of mobile terminals; a user only needs to install instant messaging software on a mobile terminal, and people can communicate with another party at any time and any place, so that instant conversations become more convenient. A mobile terminal and instant messaging software are combined to remove limitations of time and regions from instant messaging; however, in some scenarios, inconvenience is brought to the user. For example, when the user receives a message sent by another party while walking on the road, when the user views or replies to a message, the user gazes at a display screen of a mobile terminal and the mobile terminal blocks a road condition in front, causing certain safety hazards in the walking of the user.

SUMMARY

Disclosed herein are a method and an apparatus for switching a real-time image in instant messaging, so as to effectively improve safety when a user views or replies to a message while performing another action, such as walking.

A method for switching a real-time image in instant messaging applied to a terminal is disclosed, the terminal having one or more processors and a memory for storing program instructions that are executed by the one or more processors; the method may include: providing a camera installed in the terminal; receiving a real-time image turn-on instruction inside an instant messaging window indicated on the terminal, and turning on the camera according to the real-time image turn-on instruction; receiving a real-time image acquired by the camera; and switching a background of the instant messaging window to the real-time image, the real-time image being placed behind a text of the instant messaging window.

An apparatus for switching a real-time image in instant messaging indicated in a terminal is disclosed. The apparatus includes a camera; one or more processors; a memory for storing one or more program modules to be executed by the one or more processors. The one or more program modules may include: a turn-on module, configured to receive a real-time image turn-on instruction inside an instant messaging window indicated on the terminal, and turn on the camera according to the real-time image turn-on instruction; an image receiving module, configured to receive a real-time image acquired by the camera; and a background switch module, configured to switch a background of the instant messaging window to the real-time image, the real-time image being placed behind a text of the instant messaging window.

A non-transitory computer readable storage medium storing one or more programs is disclosed, the one or more programs comprising instructions, which, when executed by a terminal with one or more processors, cause the terminal to perform operations include: providing a camera installed in the terminal; receiving a real-time image turn-on instruction inside an instant messaging window indicated on the terminal, and turning on the camera according to the real-time image turn-on instruction; receiving a real-time image acquired by the camera; and switching a background of the instant messaging window to the real-time image, the real-time image being placed behind a text of the instant messaging window.

A background of an instant messaging window is switched to an image photographed by a camera for simultaneous display to the user. While a user is having a conversation with another party, the user can then also observe a road condition blocked by the body of a mobile terminal, thereby effectively improving safety when the user performs instant messaging by using the mobile terminal while, for example, walking. In addition, a real-time image may be directly switched to a background of an instant messaging window, so that the user is not influenced in viewing or sending a message, and operations become more convenient and faster.

The implementation, functional characteristics, and advantages of the present disclosure are further described with reference to the embodiments and accompanying drawings.

DESCRIPTION

It should be understood that the specific examples described herein are only used to illustrate the present disclosure, rather than to limit the present disclosure.

Figure 1:
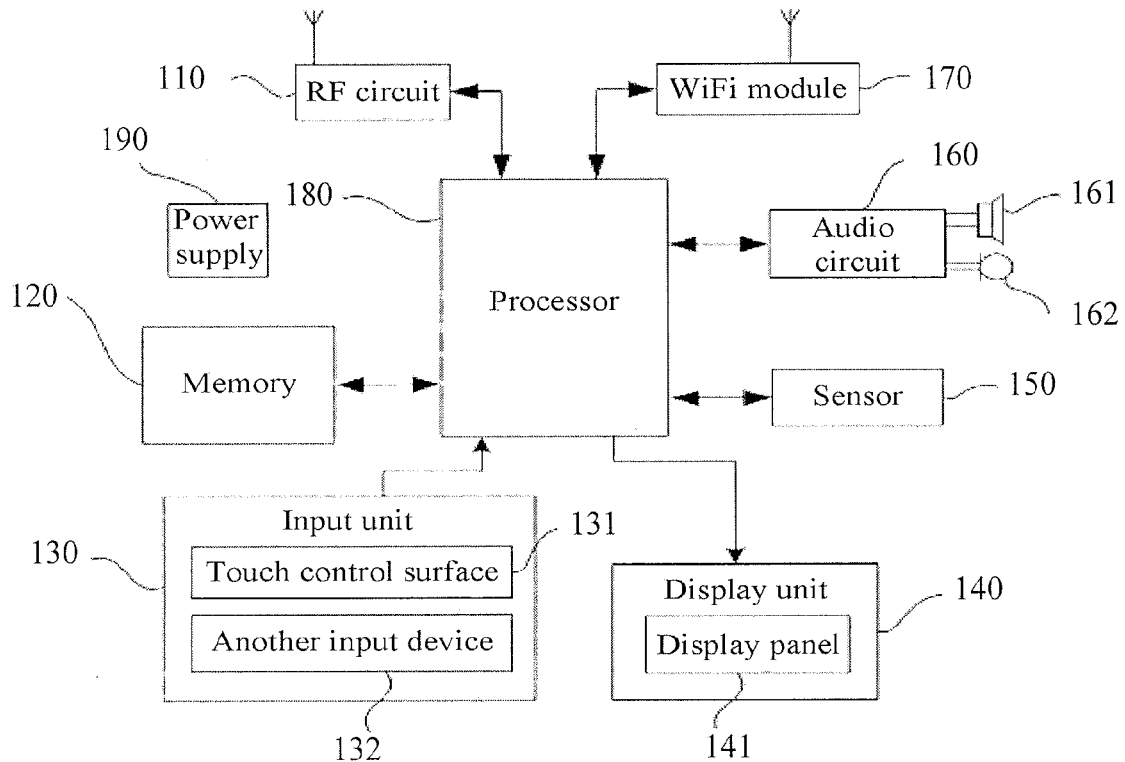
FIG. 1 is a schematic diagram of an operating environment of a method for switching a real-time image in instant messaging according to the present disclosure.

FIG. 1 is a schematic diagram of an operating environment of a method for switching a real-time image in instant messaging. The terminal may be used to perform the method for switching a real-time image in instant messaging The terminal may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art would understand that, the structure of the terminal as shown in FIG. 1 does not constitute any limitation on the terminal, and may include components more or less than those shown in the figure, or a combination of some components, or different component layouts.

The RF circuit 110 may be used to receive and send information or receive and send a signal during a call, and in particular, after receiving downlink information of a base station, hand over the downlink information to one or more processors 180 for processing; and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 110 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 120 may be configured to store a software program and a module, and the processor 180 runs the software program and the module stored in the memory 120 to implement various functional applications and data processing. The memory 120 may mainly include a program storage area and a data storage area. The program storage area can store an operating system, an application program required by at least one function (such as a voice playback function and an image playback function), and the like. The data storage area may store data (such as audio data and an address book) created according to use of the terminal. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input number or character information, and generate a keyboard, mouse, joystick, optical, or trackball signal input related to the user setting and function control. The input unit 130 may include a touch sensitive surface 131 and another input device 132. The touch sensitive surface 131 may also be referred to as a touch display screen or a touch panel, and may collect a touch operation of a user on or near the touch sensitive surface (such as a screen unlocking operation on the touch sensitive surface 131 or an operation near the touch sensitive surface 131 that are performed by a user by using any suitable object or attachment, such as a finger or a stylus), and drive a corresponding connection apparatus by using a preset program. Optionally, the touch sensitive surface 131 may include two parts: a touch detection apparatus and a touch controller. The touch detection apparatus detects a touch gesture trajectory input by a user, detects a signal generated by a touch operation, and sends the signal to the touch controller. The touch controller receives touch information from the touch detection apparatus, converts the touch information into contact coordinates, sends the contact coordinates to the processor 180, receives a command sent by the processor 180, and executes the command. In addition, the touch sensitive surface 131 may be implemented by using various types, such as a resistive type, a capacitive type, an infrared type, and a surface acoustic wave type. Besides the touch sensitive surface 131, the input unit 130 may further include another input device 132. Specifically, the another input device 132 may include, but is not limited to, one or more of a physical keyboard, a functional key (such as a volume control key and a switch key), a trackball, a mouse, and a joystick.

The display unit 140 may be configured to display information input by a user or information provided to a user, and various graphical user interfaces of the terminal, where these graphical user interfaces may be formed by a graph, a text, an icon, a video, and any combination thereof. The display unit 140 may include a display panel 141. Optionally, the display panel 141 may be configured in the form of a liquid crystal display (LCD), an organic light-emitting diode (OLED), or the like. Further, the touch sensitive surface 131 may cover the display panel 141. After detecting a touch operation on or near the touch sensitive surface 131, the touch sensitive surface 131 transfers the touch operation to the processor 180, so as to determine a type of a touch event. Subsequently, the processor 180 provides corresponding visual output on the display panel 141 according to the type of the touch event. In FIG. 1, the touch sensitive surface 131 and the display panel 141 are used as two separate parts to implement input and output functions; however, in some embodiments, the touch sensitive surface 131 and the display panel 141 may be integrated to implement the input and output functions.

The terminal may further include at least one sensor 150, for example, an optical sensor, a motion sensor, and other sensors. Specifically, the optical sensor may include an ambient light sensor and a proximity sensor, where the ambient light sensor may adjust the luminance of the display panel 141 according to brightness of the ambient light, and the proximity sensor may switch off the display panel 141 and/or backlight when the terminal is moved near an ear. As one type of the motion sensor, a gravity acceleration sensor may detect the magnitude of accelerations in various directions (which generally are tri-axial), may detect the magnitude and direction of the gravity when the sensor is still, may be configured to identify an application of a mobile phone gesture (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the terminal device 400 are not further described herein.

The audio circuit 160, a loudspeaker 161, and a microphone 162 may provide audio interfaces between a user and the terminal. The audio circuit 160 may transmit, to the loudspeaker 161, a received electric signal converted from received audio data. The loudspeaker 161 converts the electrical signal into a sound signal for output. On the other hand, the microphone 162 converts a collected sound signal into an electrical signal. The audio circuit 160 receives the electrical signal and converts the electrical signal into audio data, outputs the audio data to the processor 180 for processing. Next, the processor 180 sends the audio data to another terminal by using the RF circuit 110, or outputs the audio data to the memory 120 for further processing. The audio circuit 160 may further include an earplug jack, so as to provide communication between a peripheral earphone and the terminal.

The WiFi belongs to a short range wireless transmission technology. The terminal may help, by using a WiFi module 170, the user receive and send an e-mail, browse a webpage, access a streaming medium, and the like, and the WiFi provides the user with wireless broadband Internet access. Although FIG. 1 shows the WiFi module 170, it may be understood that, the WiFi module 170 is not an essential part of the terminal, and can be completely omitted as required without changing the nature of the present disclosure.

The processor 180 is a control center of the terminal, and connects various parts of a whole mobile phone by using various interfaces and circuits, By running or executing the software program and/or the module stored in the memory 120 and invoking data stored in the memory 120, the processor 180 performs various functions and data processing of the terminal, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like, and the modem mainly processes wireless communication. It may be understood that, the foregoing modem may also be not integrated into the processor 180.

The terminal further includes the power supply 190 (such as a battery) for supplying power to the components. Preferably, the power supply may be logically connected to the processor 180 by using a power supply management system, thereby implementing functions such as charging, discharging, and power consumption management by using the power supply management system. The power supply 190 may further include any component, such as one or more direct current or alternating current power supplies, recharging systems, power supply fault detection circuits, power supply converters or inverters, and power supply state indicators.

Although not shown in the figure, the terminal may further include a camera, a Bluetooth module, and the like, or other component that is well known in the art and which are not further described herein. Specifically, in this example, the display unit of the terminal is a touch screen display, and the terminal further includes a memory and one or more programs. The one or more programs are stored in the memory, and configured to be executed by one or more processors. The one or more programs contain operating instructions which can be used to perform the following examples of a method for switching a real-time image in instant messaging.

Figure 2:
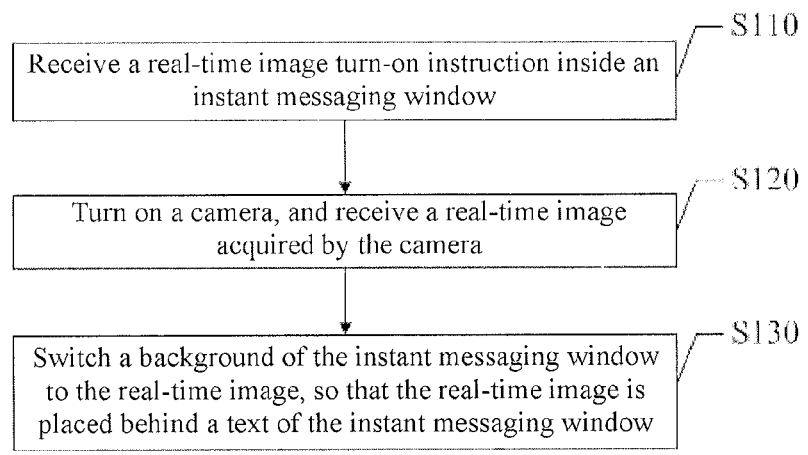
FIG. 2 is a flowchart of some embodiments of a method for switching a real-time image in instant messaging according to the present disclosure.

FIG. 2 is a flowchart of a first embodiment of a method for switching a real-time image in instant messaging according to the present disclosure. The method for switching a real-time image in instant messaging includes the following steps:

Step S110: Receive a real-time image turn-on instruction inside an instant messaging window.

Step S120: Turn on a camera, and receive a real-time image acquired by the camera.

Step S130: Switch a background of the instant messaging window to the real-time image, so that the real-time image is placed behind a text of the instant messaging window.

Figure 19:
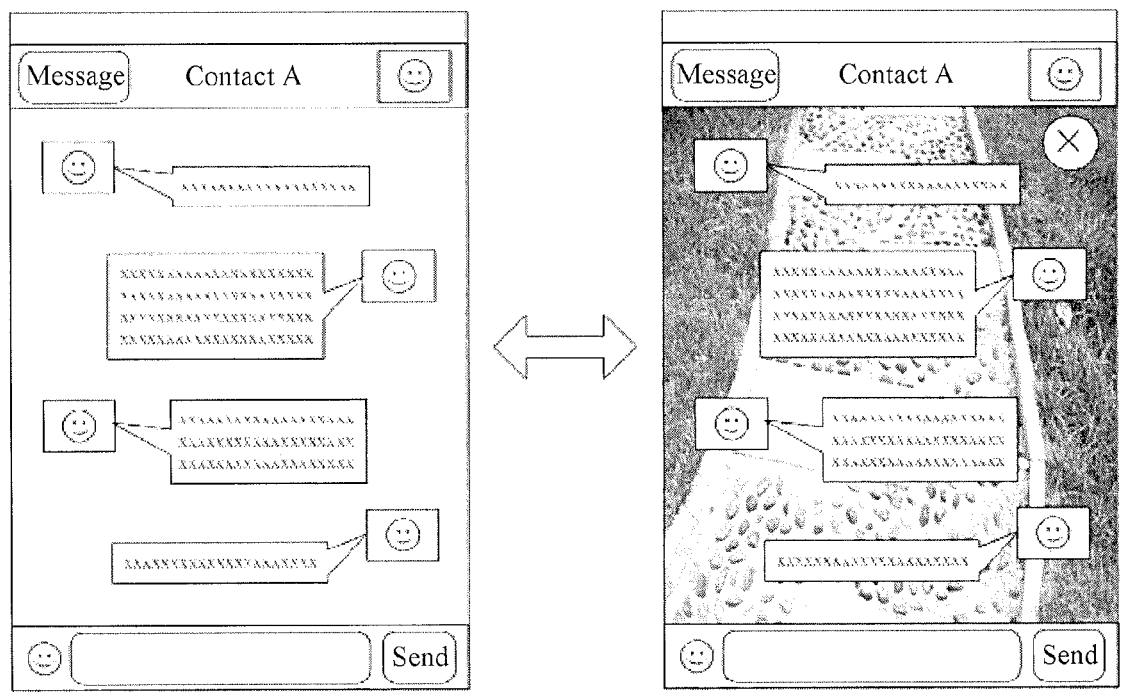
FIG. 19 is a schematic diagram of interfaces before and after a background of an instant messaging window is switched according to an embodiment of the present invention.

In this example, when instant messaging application software is used on a mobile terminal to perform information communication with another contact or user, a real-time image display function may be selected to be turned on, and a background of an instant messaging window is switched to a real-time image. When a user of the mobile terminal enables a real-time image turn-on instruction, a camera of the mobile terminal is turned on, and the camera is used to photograph a real-time image of a road condition and the like blocked by the body of the mobile terminal, and the camera is usually a rear-facing camera of the mobile terminal (that is, the surface of the camera opposed to the screen). The camera transmits a photographed image to the mobile terminal in real time, and the mobile terminal switches the background of the instant messaging window displayed on a screen of a terminal to an image photographed by the camera for simultaneous display, as shown in FIG. 19, In this way, while the user is having a conversation with another party, the user can also observe the conditions blocked by the body of the mobile terminal, thereby effectively improving safety when the user performs instant messaging by using the mobile terminal while, for example, walking. Moreover, in this embodiment, a real-time image is directly switched to a background of an instant messaging window, so that the user is not influenced in viewing or sending a message, and operations become more convenient and faster.

Figure 3:
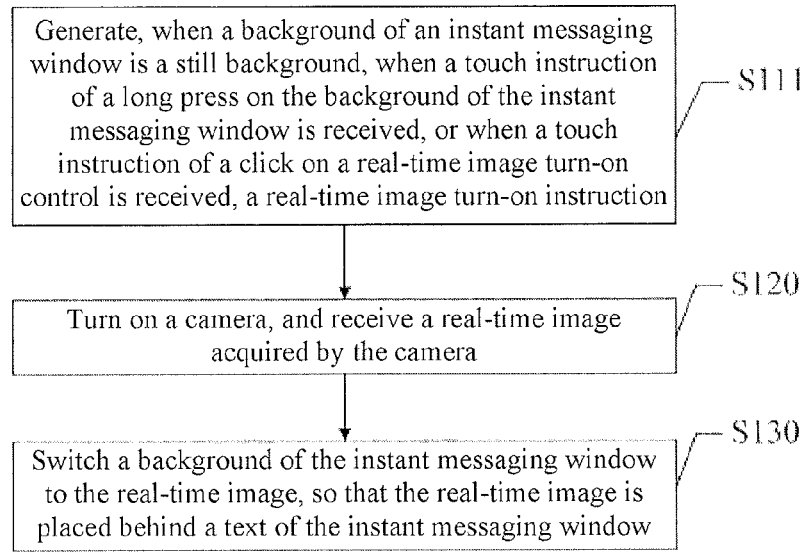
FIG. 3 is a flowchart of some embodiments of a method for switching a real-time image in instant messaging according to the present disclosure.

FIG. 3 is a flowchart of a second embodiment of a method for switching a real-time image in instant messaging. This example is based on the embodiment shown in FIG. 2, and Step S110 includes:

Step S111: Generate the real-time image turn-on instruction, if the background of the instant messaging window is a still background, when a touch instruction of a long press on the background of the instant messaging window is received, or when a touch instruction of a click on a real-time image turn-on control is received.

In a condition that a background of an instant messaging window is a still background, switching of the background of the instant messaging window may be triggered in several manners. In a manner, a long press is performed on a background of an instant messaging window displayed on a screen of a mobile terminal, and after a touch period exceeds a period threshold, a real-time image turn-on instruction is triggered. In another manner, a real-time image turn-on control on an instant messaging application interface is directly clicked to trigger a real-time image turn-on instruction. After the real-time image turn-on instruction is triggered, a camera of the mobile terminal is turned on, and a real-time image is transmitted to the instant messaging window for real-time display as the background. A user may conduct a conversation with another party by using an instant messaging software during walking, and an image of a road condition blocked by the body of the mobile terminal is displayed in real time in the background of the instant messaging window, thereby avoiding safety hazards caused by the road condition being blocked by the body.

Figure 4:
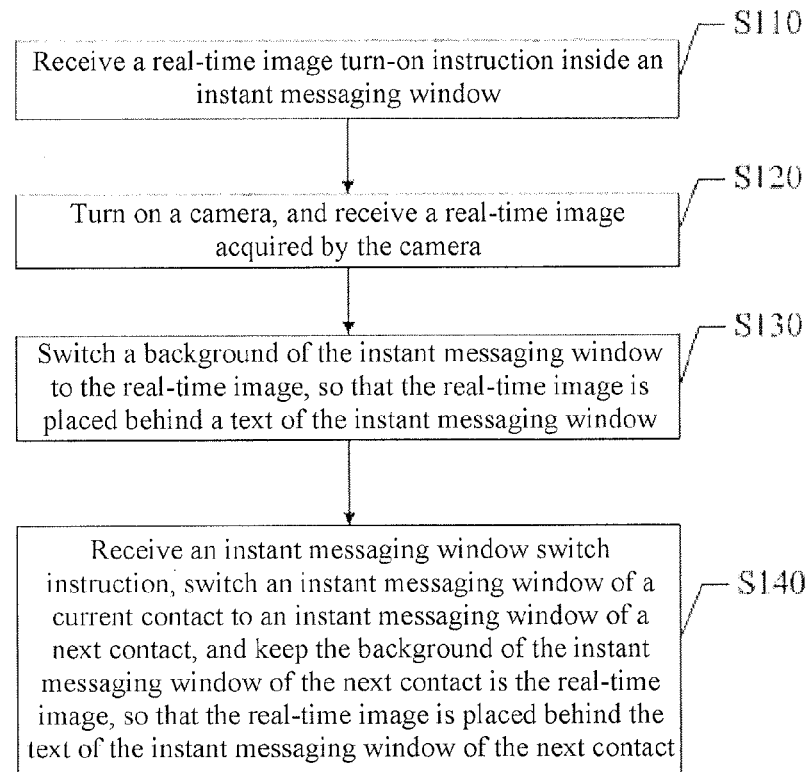
FIG. 4 is a flowchart of some embodiments of a method for switching a real-time image in instant messaging according to the present disclosure.

FIG. 4 is a flowchart of a third embodiment of a method for switching a real-time image in instant messaging. This example is based on the embodiment shown in FIG. 2, and after Step S130, the method further includes:

Step S140: Receive an instant messaging window switch instruction, switch an instant messaging window of a current contact to an instant messaging window of a next contact, and keep a background of the instant messaging window of the next contact as the real-time image, so that the real-time image is placed behind the text of the instant messaging window of the next contact.

In this example, after a background of an instant messaging window is switched to a real-time image, the switching is globally effective in an instant messaging software program. In this case, when an instant messaging window of any contact is entered, a real-time image photographed by the camera is displayed on the background of the instant messaging window, making it easy for a user to observe a road condition blocked by the body of a mobile terminal while having a conversation with another party, thereby effectively improving safety when the user performs instant messaging by using the mobile terminal while, for example, walking. Moreover, at each time of exit from an instant messaging window or when the program does not work in the foreground, the camera can be turned off temporarily and automatically, so as to avoid a waste of resources because the camera stays on for a long period of time, and help to lower energy consumption of the mobile terminal, and when an instant messaging window is turned on a next time, the camera is automatically turned on.

Figure 5:
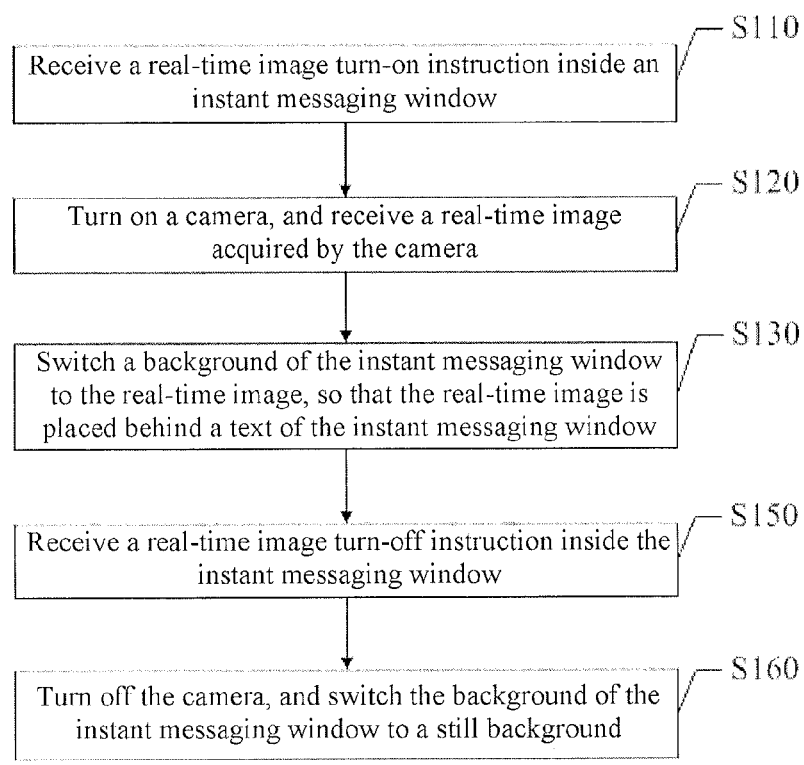
FIG. 5 is a flowchart of some embodiments of a method for switching a real-time image in instant messaging according to the present disclosure.

FIG. 5 is a flowchart of a fourth embodiment of a method for switching a real-time image in instant messaging. This example is based on the embodiment shown in FIG. 2, and after Step S130, the method further includes:

Step S150: Receive a real-time image turn-off instruction inside the instant messaging window.

Step S160: Turn off the camera, and switch the background of the instant messaging window to a still background.

In this example, when a real-time image does not need to be displayed, for example, when a user is not walking, the user may select to turn off a real-time image display function. After the user selects to turn off a real-time image, a mobile terminal controls the camera to be turned off and interrupts acquisition of the real-time image; meanwhile, the mobile terminal switches a current background of an instant messaging window to, for example, a predetermined still background. After the function is turned off, the turn-off is globally effective in a program, and later, when an instant messaging window of any contact is entered, a background of the instant messaging window restores a previous setting of a still background, so as to avoid a waste of resources because the camera stays on for a long period of time, and help to lower energy consumption of the mobile terminal.

Figure 6:
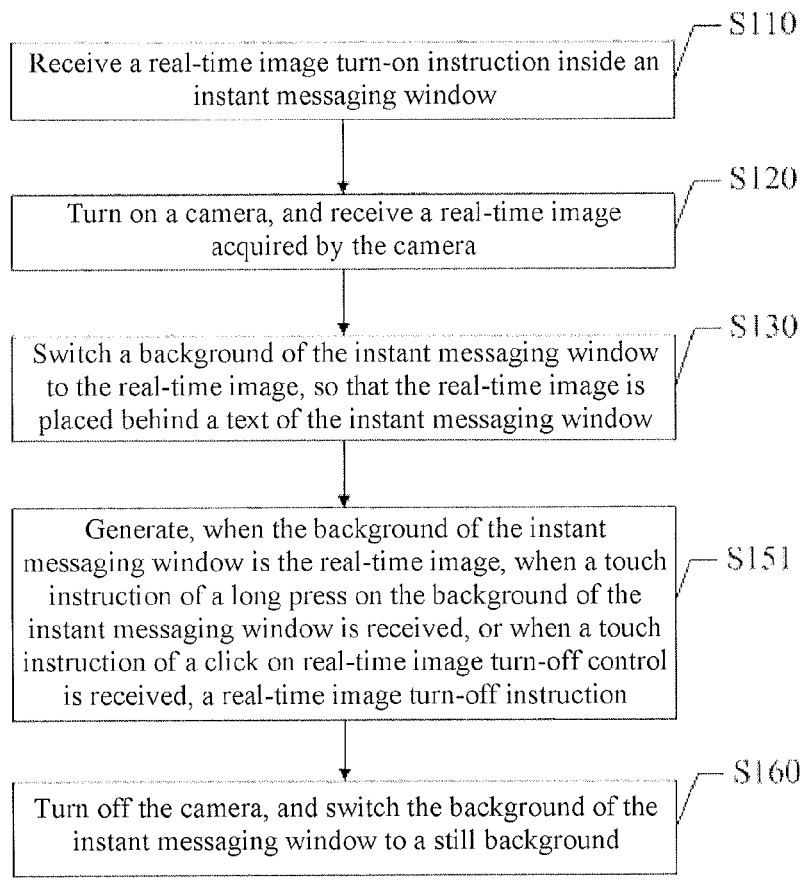
FIG. 6 is a flowchart of some embodiments of a method for switching a real-time image in instant messaging according to the present disclosure.

FIG. 6 is a flowchart of a fifth embodiment of a method for switching a real-time image in instant messaging. This example is based on the embodiment shown in FIG. 5, and Step S150 includes:

Step S151: Generate the real-time image turn-off instruction, when the background of the instant messaging window is the real-time image, when a touch instruction of a long press on the background of the instant messaging window is received, or when a touch instruction of a click on real-time image turn-off control is received.

In this example, in a condition that a background of an instant messaging window is a real-time image, the turn-off of the real-time image in background of the instant messaging window may be triggered in several manners. For example, a long press is performed on a background of an instant messaging window displayed on a screen of a mobile terminal, and after a touch period exceeds a period threshold, a real-time image turn-off instruction is triggered. In another example, a real-time image turn-off control on an instant messaging application interface is directly clicked to trigger a real-time image turn-off instruction. After a real-time image turn-off instruction is triggered, the camera of the mobile terminal is turned off and acquisition of a real-time image is interrupted; meanwhile, the mobile terminal switches a current background of an instant messaging window to, for example, a predetermined still background, so that energy consumption of the mobile terminal is lowered.

Figure 7:
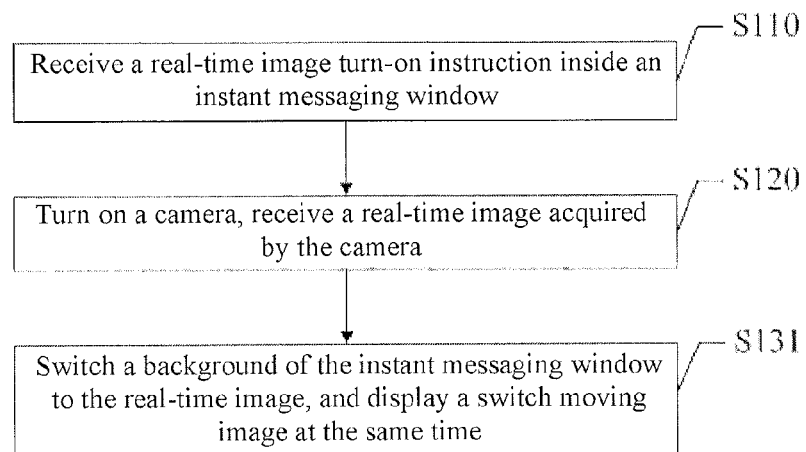
FIG. 7 is a flowchart of some embodiments of a method for switching a real-time image in instant messaging according to the present disclosure.

FIG. 7 is a flowchart of a sixth embodiment of a method for switching a real-time image in instant messaging. This example is based on the embodiment shown in FIG. 2, and Step S130 further includes:

Step S131: Switch the background of the instant messaging window to the real-time image, and display a switch moving image at the same time.

In this example, to inform a user that a background of a real-time image is turned on, while a background is being switched, switching may be performed in a manner of presentation by using a moving image. For example, a predetermined original still background is switched to a real-time image in a switching manner of displaying a moving transition image such as a ripple and a louver. Moreover, when the user turns off an instant messaging window or a program runs in the background. In this case, a camera has been automatically turned off to lower energy consumption. When the user reopens an instant messaging window of a contact, the camera is turned on again, and in this case, a transition moving image may also be displayed to inform the user that the camera is only turned on when the instant messaging window is reopened, which helps to lower energy consumption of a mobile terminal and provide the user with convenience.

Figure 8:
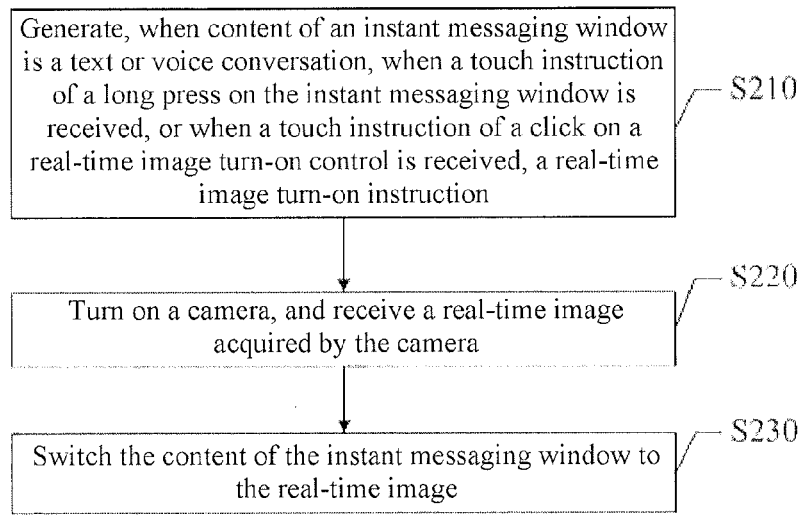
FIG. 8 is a flowchart of some embodiments of a method for switching a real-time image in instant messaging according to the present disclosure.

FIG. 8 is a flowchart of a seventh embodiment of a method for switching a real-time image in instant messaging. The method for switching a real-time image in instant messaging mentioned in this embodiment includes steps:

Step S210: Generate, a real-time image turn-on instruction, when content of an instant messaging window is a text or voice conversation, when a touch instruction of a long press on the instant messaging window is received, or when a touch instruction of a click on a real-time image turn-on control is received.

Step S220: Turn on a camera, and receive a real-time image acquired by the camera.

Step S230: Switch the content of the instant messaging window to the real-time image.

In this example, when instant messaging application software is used on a mobile terminal to perform information communication with another contact, a real-time image display function may be selected to be turned on, and content of an instant messaging window is switched to a real-time image. Switching of content of the instant messaging window may be triggered in several manners. For example, a long press is performed on an instant messaging window displayed on the screen of a mobile terminal, and after a touch period exceeds a period threshold, a real-time image turn-on instruction is triggered. In another example, a real-time image turn-on control on an instant messaging application interface is directly clicked to trigger a real-time image turn-on instruction. After the real-time image turn-on instruction is triggered, a camera of the mobile terminal is turned on, the camera transmits a photographed image to the mobile terminal in real time, the mobile terminal switches in time content of an instant messaging window displayed on the screen of the terminal to the image photographed by the camera for simultaneous display.

Figure 20:
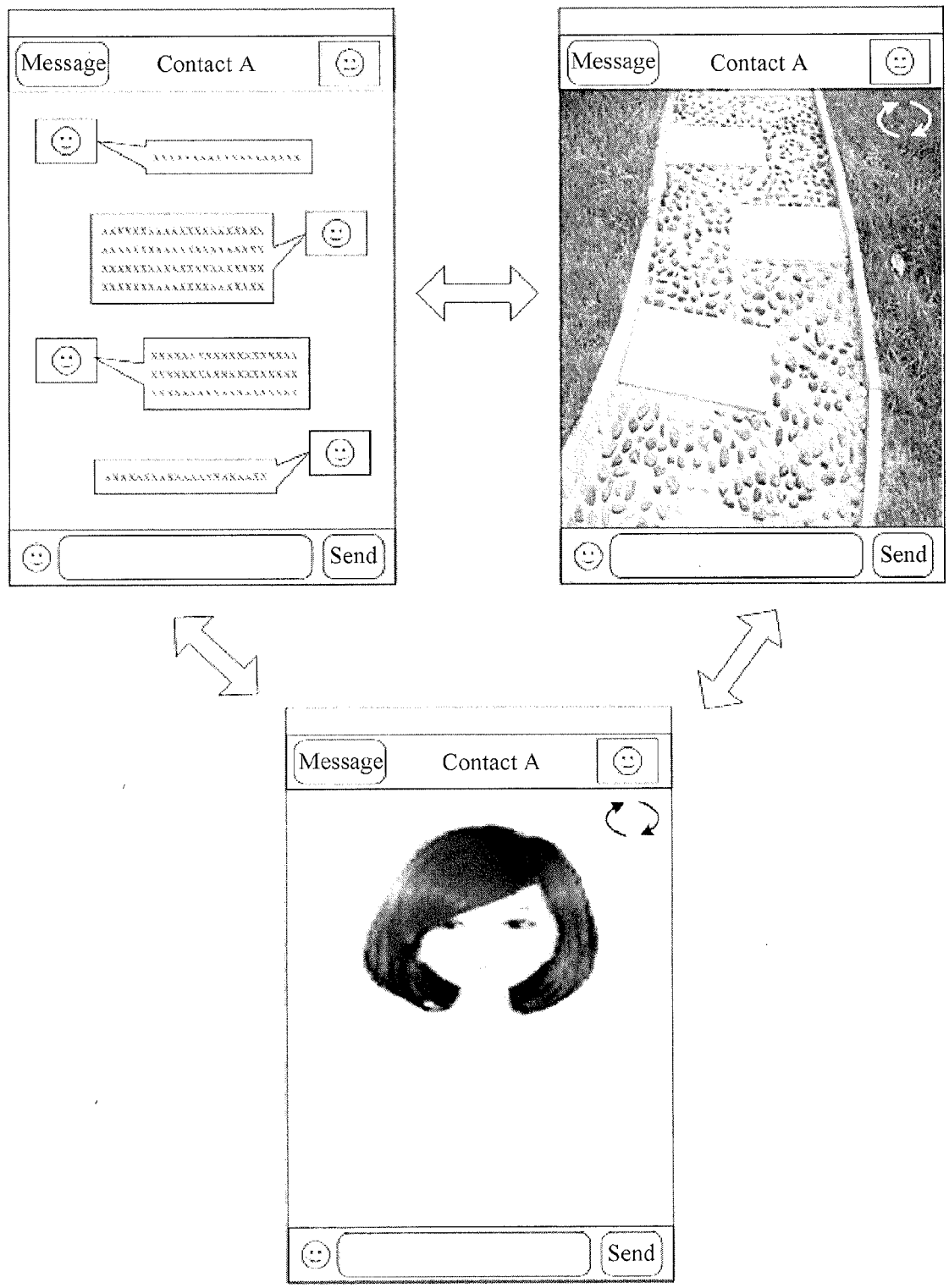
FIG. 20 is a schematic diagram of interfaces before and after content of an instant messaging window is switched according to an embodiment of the present invention.

The foregoing camera may be a forward-facing or rear-facing camera of a mobile terminal. It may be determined in a preset manner to use the forward-facing or rear-facing camera, or it may be selected to switch a camera after content of an instant messaging window is switched to a real-time image, so as to achieve switching of a photographed real-time image. In FIG. 20, when the forward-facing camera is turned on, an image of a current user is photographed, an instant messaging window enters a video chat state, the mobile terminal may transmit, through a network, a real-time image photographed by the forward-facing camera to a terminal of another contact, and meanwhile may also receive a real-time image from the terminal of the other contact and display the real-time image on the screen of a local mobile terminal. When the rear-facing camera is turned on, the camera photographs a real-time image of a road condition blocked by the body of the mobile terminal and the user can observe, while having a conversation with another party, the road condition blocked by the body of the mobile terminal, thereby effectively improving safety when the user performs instant messaging by using the mobile terminal while walking.

Figure 9:
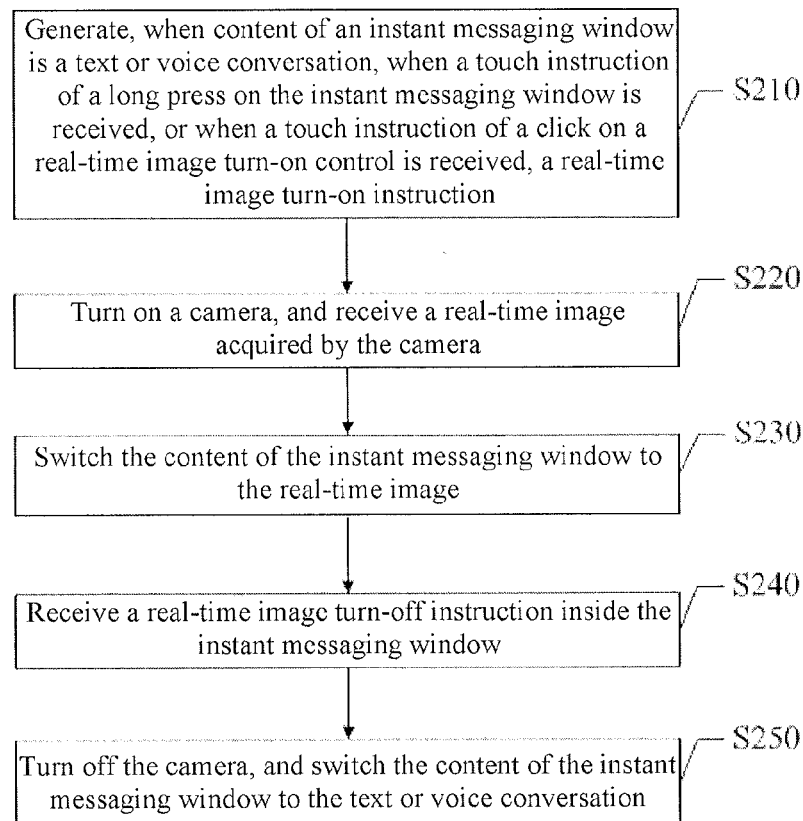
FIG. 9 is a flowchart of some embodiments of a method for switching a real-time image in instant messaging according to the present disclosure.

FIG. 9 is a flowchart of an eighth embodiment of a method for switching a real-time image in instant messaging according to the present disclosure. This example is based on the embodiment shown in FIG. 8, and after Step S230, the method further includes:

Step S240: Receive a real-time image turn-off instruction inside the instant messaging window.

Step S250. Turn off the camera, and switch the content of the instant messaging window to the text or voice conversation.

In this example, when a real-time image does not need to be displayed, a user may select to turn off a real-time image display function. A mobile terminal controls a camera to be turned off and interrupts acquisition of the real-time image, and meanwhile, the mobile terminal switches content of a current instant messaging window to a previous text or voice conversation window, so as to avoid a waste of resources because the camera stays on for a long period of time, and help to lower energy consumption of the mobile terminal.

Figure 10:
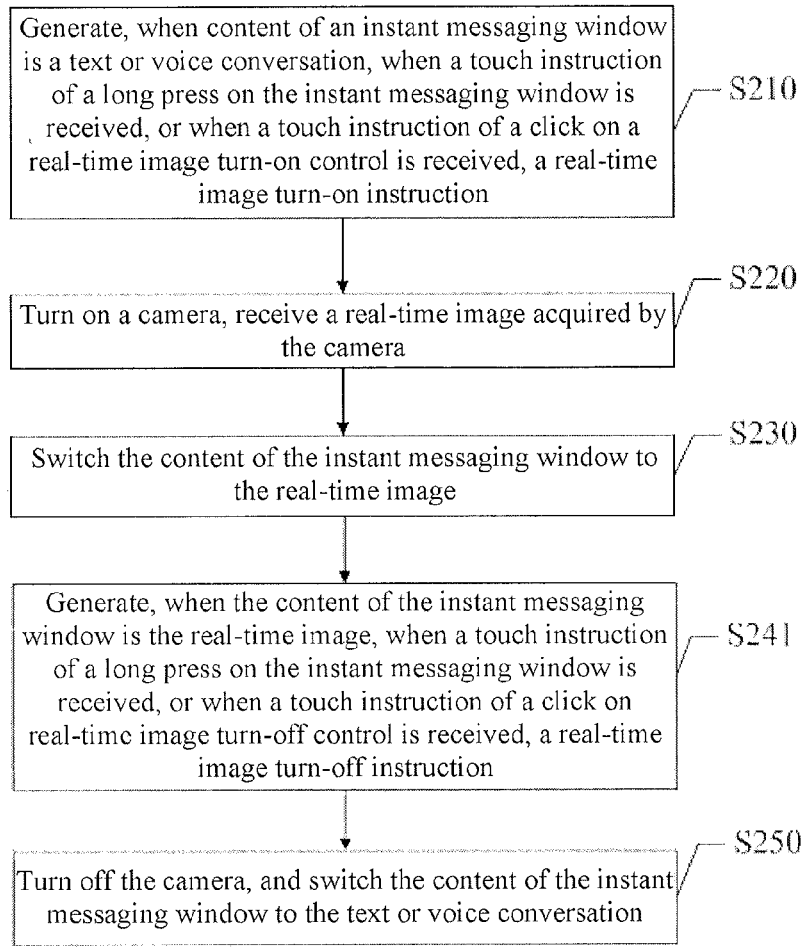
FIG. 10 is a flowchart of some embodiments of a method for switching a real-time image in instant messaging according to the present disclosure.

FIG. 10 is a flowchart of a ninth embodiment of a method for switching a real-time image in instant messaging according to the present disclosure. This example is based on the embodiment shown in FIG. 9, and Step S240 includes:

Step S241: Generate, the real-time image turn-off instruction, when the content of the instant messaging window is the real-time image, when a touch instruction of a long press on the instant messaging window is received, or when a touch instruction of a click on real-time image turn-off control is received.

In this example, in a condition that content of an instant messaging window is a real-time image, the turn-off of the real-time image in the instant messaging window may be triggered in several manners. In an example, a long press is performed on an instant messaging window displayed on a screen of a mobile terminal, and after a touch period exceeds a period threshold, a real-time image turn-off instruction is triggered. In another example, a real-time image turn-off control on an instant messaging application interface is directly clicked to trigger a real-time image turn-off instruction. After a real-time image turn-off instruction is triggered, a camera of the mobile terminal is turned off and acquisition of a real-time image is interrupted, and meanwhile, the mobile terminal switches content of a current instant messaging window to a previous text or voice conversation window, so that energy consumption of the mobile terminal is lowered.

Figure 11:
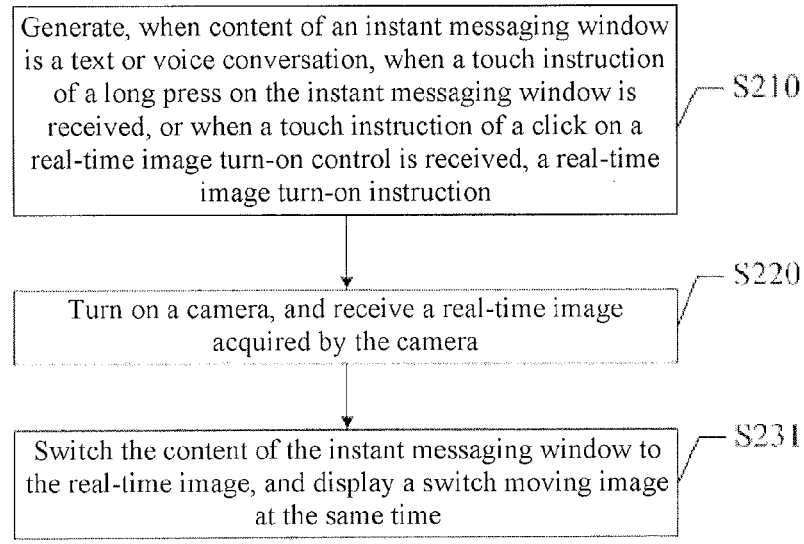
FIG. 11 is a flowchart of some embodiments of a method for switching a real-time image in instant messaging according to the present disclosure.

FIG. 11 is a flowchart of a tenth embodiment of a method for switching a real-time image in instant messaging. This example is based on the embodiment shown in FIG. 8, and Step S230 includes:

Step S231: Switch the content of the instant messaging window to the real-time image, and display a switch moving image at the same time.

In this example, to inform a user that a real-time image is turned on, while content of an instant messaging window is being switched, switching may be performed by display of a moving image. For example, an original text or voice conversation window is switched to a real-time image in a switching manner of displaying a moving image such as a ripple or a louver. Moreover, when the user turns off the instant messaging window or a program runs in the background, in this case, to lower energy consumption, a mobile terminal temporarily and automatically turns off a camera. When the user reopens an instant messaging window of a contact, the camera is turned on again, and in this case, a moving image may also be displayed to inform the user that the camera is only turned on when the instant messaging window is reopened, which helps to lower energy consumption of the mobile terminal and provide the user with convenience.

Figure 12:
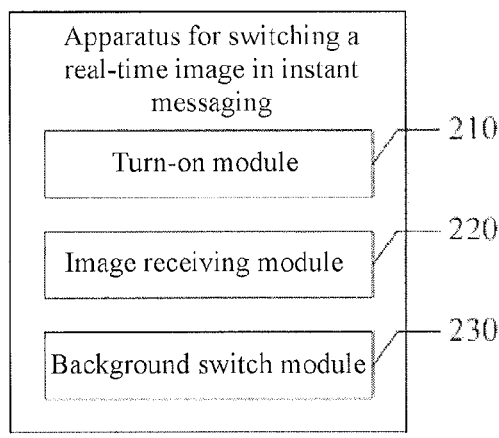
FIG. 12 is a schematic structural diagram of some embodiments of an apparatus for switching a real-time image in instant messaging according to the present disclosure.

FIG. 12 is a schematic structural diagram of a first embodiment of an apparatus for switching a real-time image in instant messaging. The apparatus for switching a real-time image in instant messaging mentioned in this embodiment includes: a turn-on module 210, configured to receive a real-time image turn-on instruction inside an instant messaging window, turn-on a camera; an image receiving module 220, configured to receive a real-time image acquired by the camera; and a background switch module 230, configured to switch a background of the instant messaging window to the real-time image, so that the real-time image is placed behind a text of the instant messaging window.

In this example, when instant messaging application software is used on a mobile terminal to perform information communication with another contact, a real-time image display function may be selected to be turned on, and a background of an instant messaging window is switched to a real-time image. When a user triggers a real-time image turn-on instruction, a camera of the mobile terminal is turned on, and the camera is used to photograph a real-time image of a road condition, or the like, blocked by the body of the mobile terminal. The camera is usually a rear-facing camera of the mobile terminal. The camera transmits a photographed image to the mobile terminal in real time, the mobile terminal switches in time the background of the instant messaging window displayed on a screen of the terminal to the image photographed by the camera for synchronous display, as shown in FIG. 19. After the function is turned on, the turn-on may be globally effective in a program. In this case, in an instant messaging window of any contact, a real-time image photographed by the camera is displayed on a background of the instant messaging window. At each time of exit from an instant messaging window or when the program does not work in the foreground, the camera is automatically turned off, and when an instant messaging window is entered a next time, the camera is automatically turned on. In this way, while the user is having a conversation with another party, the user can also observe the road condition blocked by the body of the mobile terminal, thereby effectively improving safety when the user performs instant messaging by using the mobile terminal. Moreover, in this example, a real-time image is directly switched to a background of an instant messaging window, so that the user is not influenced in viewing or sending a message, and operations become more convenient and faster.

Furthermore, the turn-on module 210 is further configured to: generate a real-time image turn-on instruction when the background of the instant messaging window is a still background, when a touch instruction of a long press on the background of the instant messaging window is received, or when a touch instruction of a click on a real-time image turn-on control is received.

In this example, in a condition that a background of an instant messaging window is a still background, switching of the background of the instant messaging window may be triggered in several ways. In an example, a long press is performed on a background of an instant messaging window displayed on a screen of a mobile terminal, and after a touch period exceeds a period threshold, a real-time image turn-on instruction is triggered. In another example, a real-time image turn-on control on an instant messaging application interface is directly clicked to trigger a real-time image turn-on instruction. After the real-time image turn-on instruction is triggered, a rear-facing camera of the mobile terminal is turned on, and a real-time image is transmitted to a background of an instant messaging window for display. A user may make a conversation with another party by using the instant messaging software during walking, and an image of a road condition blocked by the body of the mobile terminal is displayed in real time in the background of the instant messaging window, thereby avoiding safety hazards caused by the road condition being blocked by the body.

Figure 13:
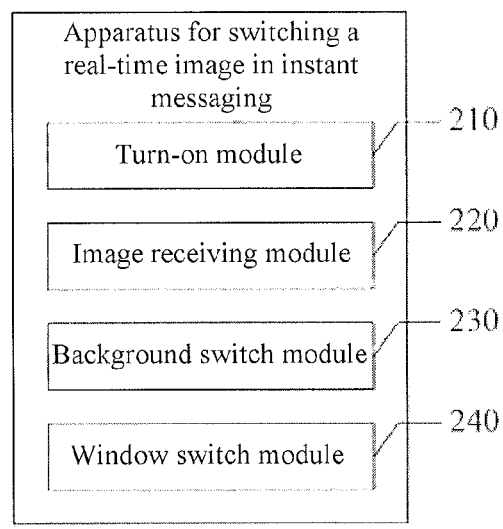
FIG. 13 is a schematic structural diagram of some embodiments of an apparatus for switching a real-time image in instant messaging according to the present disclosure.

FIG. 13 is a schematic structural diagram of a second embodiment of an apparatus for switching a real-time image in instant messaging. In this embodiment, based on the embodiment shown in FIG. 12, the following module is added: a window switch module 240, configured to receive an instant messaging window switch instruction, switch an instant messaging window of a current contact to an instant messaging window of a next contact, and keep a background of the instant messaging window of the next contact as a real-time image, so that the real-time image is placed behind the text of the instant messaging window of the next contact.

In this example, after a background of an instant messaging window is switched to a real-time image, the switching is globally effective in an instant messaging software program. In this case, in an instant messaging window of any contact, a real-time image photographed by a camera is displayed on the background of the instant messaging window, making it easy for a user to observe a road condition blocked by the body of a mobile terminal while having a conversation with another party, thereby effectively improving safety when the user performs instant messaging by using the mobile terminal while walking. Moreover, at each time of exit from an instant messaging window or when the program does not work in the foreground, the camera can be turned off temporarily and automatically, so as to avoid a waste of resources because the camera stays on for a long period of time, and help to lower energy consumption of the mobile terminal, and when an instant messaging window is turned on a next time, the camera is automatically turned on.

Figure 14:
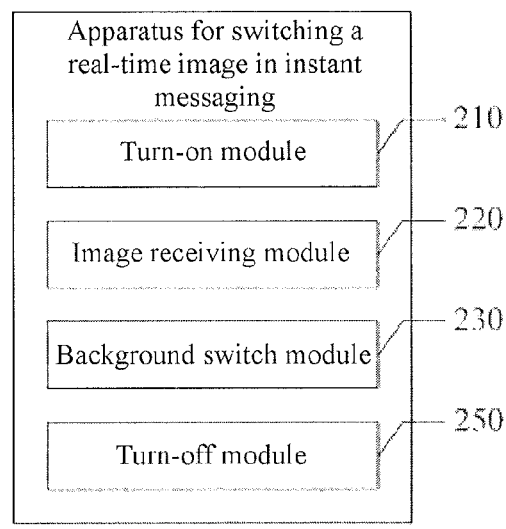
FIG. 14 is a schematic structural diagram of some embodiments of an apparatus for switching a real-time image in instant messaging according to the present disclosure.

FIG. 14 is a schematic structural diagram of a third embodiment of an apparatus for switching a real-time image in instant messaging. In this embodiment, based on the embodiment shown in FIG. 12, a turn-off module 250 is added, and is configured to: when a real-time image turn-off instruction is received inside an instant messaging window, turn off a camera; and the background switch module 230 is further configured to switch a background of the instant messaging window to a still background.

In this example, when a real-time image does not need to be displayed, for example, when a user is not walking, the user may select to turn off a real-time image display function After the user selects to turn off a real-time image, a mobile terminal controls a camera to be turned off and interrupts acquisition of the real-time image; meanwhile, the mobile terminal switches a current background of an instant messaging window to an original still background. After the function is turned off, the turn-off is globally effective in a program, and later, when an instant messaging window of any contact is entered, a background of the instant messaging window restores a previous setting of a still background, so as to avoid a waste of resources because the camera stays on for a long period of time, and help to lower energy consumption of the mobile terminal.

Furthermore, the turn-off module 250 is further configured to: generate, the real-time image turn-off instruction, when a background of a current instant messaging window is the real-time image, when a touch instruction of a long press on the background of the instant messaging window is received, or when a touch instruction of a click on real-time image turn-off control is received.

In this example, in a condition that a background of an instant messaging window is a real-time image, the turn-off of the real-time image in background of the instant messaging window may be triggered in several ways. In an example, a long press is performed on a background of an instant messaging window displayed on a screen of a mobile terminal, and after a touch period exceeds a period threshold, a real-time image turn-off instruction is triggered. In another example, a real-time image turn-off control on an instant messaging application interface is directly clicked to trigger a real-time image turn-off instruction. After a real-time image turn-off instruction is triggered, a camera of the mobile terminal is turned off and acquisition of a real-time image is interrupted; meanwhile, the mobile terminal switches a current background of an instant messaging window to an original still background, so that energy consumption of the mobile terminal is lowered.

Figure 15:
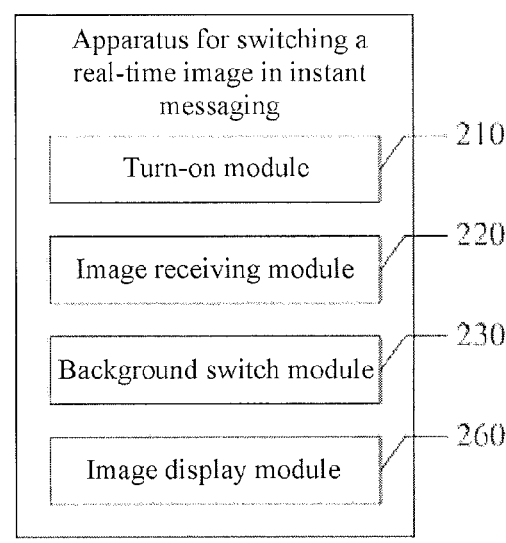
FIG. 15 is a schematic structural diagram of some embodiments of an apparatus for switching a real-time image in instant messaging according to the present disclosure.

FIG. 15 is a schematic structural diagram of a fourth embodiment of an apparatus for switching a real-time image in instant messaging. In this example, based on the embodiment shown in FIG. 12, a moving image display module 260 is added, and is configured to switch the background of the instant messaging window to the real-time image, and at the same time display a switch moving image.

In this example, to inform a user that a background of a real-time image is turned on, while a background is being switched, switching may be performed by displaying a moving image. For example, an original still background is switched to a real-time image by displaying a moving image such as a ripple or a louver. Moreover, when the user turns off an instant messaging window or a program runs in the background, in this case, a camera has been automatically turned off to lower energy consumption. When the user reopens an instant messaging window of a contact, the camera is turned on again, and in this case, a switch indicating moving image may also be displayed to inform the user that the camera is only turned on when the instant messaging window is reopened, which helps to lower energy consumption of a mobile terminal and provide the user with convenience.

Figure 16:
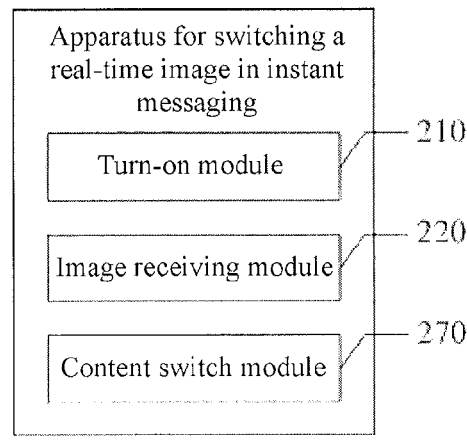
FIG. 16 is a schematic structural diagram of some embodiments of an apparatus for switching a real-time image in instant messaging according to the present disclosure.

FIG. 16 is a schematic structural diagram of a fifth embodiment of an apparatus for switching a real-time image in instant messaging. The apparatus for switching a real-time image in instant messaging described in this example includes: a turn-on module 210, configured to generate a real-time image turn-on instruction, when content of an instant messaging window is a text or voice conversation, when a touch instruction of a long press on the instant messaging window is received, or when a touch instruction of a click on a real-time image turn-on control is received, and to turn on a camera; an image receiving module 220, configured to receive a real-time image acquired by the camera; and a content switch module 270, configured to switch the content of the instant messaging window to the real-time image.

In this example, when instant messaging application software is used on a mobile terminal to perform information communication with another contact, a real-time image display function may be selected to be turned on, and content of an instant messaging window is switched to a real-time image. Switching of content of the instant messaging window may be triggered in several ways. In an example, a long press is performed on an instant messaging window displayed on the screen of a mobile terminal, and after a touch period exceeds a period threshold, a real-time image turn-on instruction is triggered. In another example, a real-time image turn-on control on an instant messaging application interface is directly clicked to trigger a real-time image turn-on instruction. After the real-time image turn-on instruction is triggered, a camera of the mobile terminal is turned on, the camera transmits a photographed image to the mobile terminal in real time, and the mobile terminal switches the content of an instant messaging window displayed on the screen of the terminal to the image photographed by the camera for simultaneous display.

The camera may be a forward-facing or rear-facing camera of a mobile terminal. It may be determined in a preset manner to use the forward-facing or rear-facing camera, or it may be selected to switch a camera after content of an instant messaging window is switched to a real-time image, so as to achieve switching of a photographed real-time image. When the forward-facing camera is turned on, an image of a current user is photographed, an instant messaging window enters a video chat state, the mobile terminal may transmit, through a network, a real-time image photographed by the forward-facing camera to a terminal of another contact, and meanwhile may also receive a real-time image from the terminal of the other contact and display the real-time image on the screen of a local mobile terminal. When the rear-facing camera is turned on, the camera photographs a real-time image of a road condition blocked by the body of the mobile terminal, and the user can observe, while having a conversation with another party, the road condition blocked by the body of the mobile terminal, thereby effectively improving safety when the user performs instant messaging by using the mobile terminal while walking.

Figure 17:
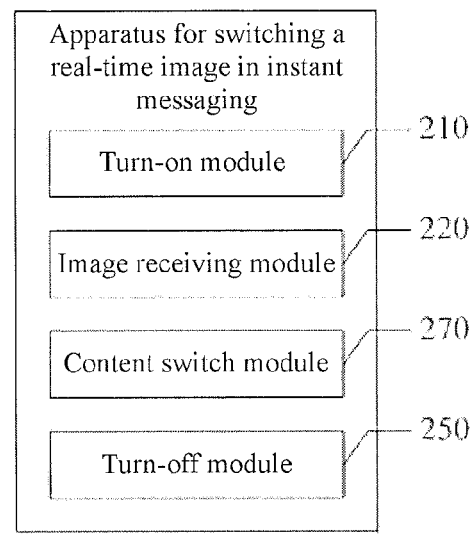
FIG. 17 is a schematic structural diagram of some embodiments of an apparatus for switching a real-time image in instant messaging according to the present disclosure.

FIG. 17 is a schematic structural diagram of a sixth embodiment of an apparatus for switching a real-time image in instant messaging. In this example, based on the embodiment shown in FIG. 16, a turn-off module 250 is added, and is configured to: when a real-time image turn-off instruction is received inside an instant messaging window, turn off a camera; and the content switch module is further configured to switch the content of the instant messaging window to the text or voice conversation.

In this example, when a real-time image does not need to be displayed, a user may select to turn off a real-time image display function, a mobile terminal controls a camera to be turned off and interrupts acquisition of the real-time image; meanwhile, the mobile terminal switches content of a current instant messaging window to an original text or voice conversation window, so as to avoid a waste of resources when the camera stays on for a long period of time, and help to lower energy consumption of the mobile terminal.

Furthermore, the turn-off module may be configured to generate the real-time image turn-off instruction when the content of the instant messaging window is the real-time image, when a touch instruction of a long press on the instant messaging window is received, or when a touch instruction of a click on real-time image turn-off control is received.

In this example, in a condition that content of an instant messaging window is a real-time image, the turn-off of the real-time image in the instant messaging window may be triggered in several manners. In an example, a long press is performed on an instant messaging window displayed on a screen of a mobile terminal, and after a touch period exceeds a period threshold, a real-time image turn-off instruction is triggered. In another example, a real-time image turn-off control on an instant messaging application interface is directly clicked to trigger a real-time image turn-off instruction. After the real-time image turn-off instruction is triggered, a camera of the mobile terminal is turned off and acquisition of a real-time image is interrupted; meanwhile, the mobile terminal switches content of a current instant messaging window to an original text or voice conversation window, and energy consumption of the mobile terminal is lowered.

Figure 18:
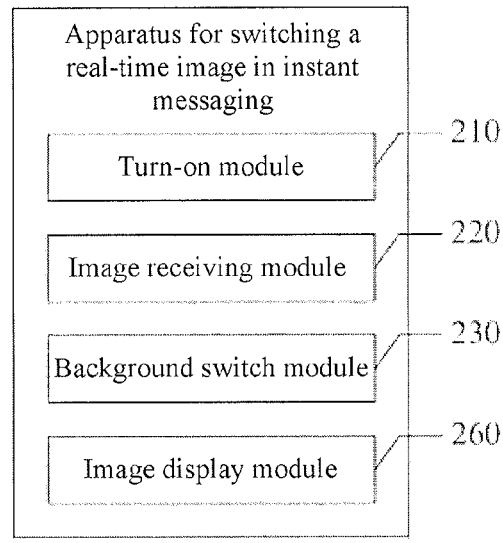
FIG. 18 is a schematic structural diagram of some embodiments of an apparatus for switching a real-time image in instant messaging according to the present disclosure.

FIG. 18 is a schematic structural diagram of a seventh embodiment of an apparatus for switching a real-time image in instant. In this example, based on the embodiment shown in FIG. 16, the following is added: a moving image display module 260, configured to switch content of an instant messaging window to the real-time image, and at the same time display a switch-indicating moving image.

In this example, to inform a user that a real-time image is turned on, while content of an instant messaging window is being switched, switching may be performed by presentation of a moving image. For example, an original text or voice conversation window is switched to a real-time image in a switching manner, moving image such as a ripple and a louver may be displayed. Moreover, when the user turns off the instant messaging window or a program runs in the background, in this case, to lower energy consumption, a mobile terminal temporarily and automatically turns off a camera. When the user reopens an instant messaging window of a contact, the camera is turned on again, and in this case, a switch moving image may also be displayed to inform the user that the camera is only turned on when the instant messaging window is reopened, which helps to lower energy consumption of the mobile terminal and provide the user with convenience.

It should be noted that the terms "include", "comprise", and any variation thereof are intended to cover a non-exclusive inclusion". Therefore, in the context of a process, method, object, or device that includes a series of elements, the process, method, object, or apparatus not only includes such elements, but also includes other elements not specified expressly, or may include inherent elements of the process, method, object, or apparatus. If no more limitations are made, an element limited by "include a/an . . . " does not exclude other same elements existing in the process, the method, the article, or the apparatus which includes the element.

The sequence numbers of the above examples of the present disclosure are merely for the convenience of description, and do not imply the preference among the embodiments.

Through the above description of the implementation manners, it is clear to persons skilled in the art that the present disclosure may be accomplished through software plus a hardware platform, or through hardware; however, the former is the preferred implementation manner in many cases. Based on this, the above technical solution of the present disclosure or the part that makes contributions to the prior art can be substantially embodied in the form of a computer program product. The computer program product may be stored in a storage medium (for example, a ROM/RAM, a magnetic disk, and an optical disc), and contain several instructions configured to instruct a terminal device (which may be a mobile phone, a computer, a server, or network equipment) to perform the method \.

The foregoing descriptions are merely examples but are not intended to limit the patent scope of the present claims. Any equivalent modifications made to the structures or processes based on the content of the specification and the accompanying drawings of the present disclosure for direct or indirect use in other relevant technical fields shall also be encompassed in the patent protection scope of the present claims.

What is claimed is:

1. A method for switching a real-time image in instant messaging applied to a terminal, the terminal having one or more processors and a memory for storing program instructions that are executed by the one or more processors, the method comprising:
    providing a camera installed in the terminal;
    receiving a real-time image turn-on instruction inside an instant messaging window indicated on the terminal, and turning on the camera according to the real-time image turn-on instruction;
    receiving a real-time image acquired by the camera;
    switching a background of the instant messaging window to the real-time image, the real-time image being placed behind a text of the instant messaging window, and
    receiving an instant messaging window switch instruction;
    switching an instant messaging window of a current contact to an instant messaging window of a next contact; and
    maintaining a background of the instant messaging window of the next contact as the real-time image, so that the real-time image is placed behind the text of the instant messaging window of the next contact.

2. The method according to claim 1, wherein the receiving a real-time image turn-on instruction inside an instant messaging window comprises:
    generating the real-time image turn-on instruction, when the background of the instant messaging window is a still background, when a touch instruction of a long press on the background of the instant messaging window is received.

3. The method according to claim 1, wherein the receiving a real-time image turn-on instruction inside an instant messaging window comprises:
    generating the real-time image turn-on instruction, when the background of the instant messaging window is a still background, when a touch instruction of a click on a real-time image turn-on control is received.

4. The method according to claim 1, after the step of switching a background of the instant messaging window to the real-time image, so that the real-time image is placed behind a text of the instant messaging window, further comprising:
    receiving a real-time image turn-off instruction inside the instant messaging window, turning off the camera, and switching the background of the instant messaging window to a still background.

5. The method according to claim 4, wherein the receiving a real-time image turn-off instruction inside the instant messaging window comprises:
    generating the real-time image turn-off instruction, when the background of the instant messaging window is the real-time image, when a touch instruction of a long press on the background of the instant messaging window is received, or when a touch instruction of a click on real-time image turn-off control is received.

6. The method according to claim 1, wherein the switching a background of the instant messaging window to the real-time image comprises:
    switching the background of the instant messaging window to the real-time image, and displaying a switch-moving image at a same time.

7. An apparatus for switching a real-time image in instant messaging indicated in a terminal, comprising:
a camera;
one or more processors;
a memory for storing one or more program modules comprising instructions to be executed by the one or more processors, the one or more program modules comprising:
a turn-on module, configured to receive a real-time image turn-on instruction inside an instant messaging window indicated on the terminal, and turn on the camera according to the real-time image turn-on instruction;
an image receiving module, configured to receive a real-time image acquired by the camera;
a background switch module, configured to switch a background of the instant messaging window to the real-time image, the real-time image being placed behind a text of the instant messaging window, and
a window switch module, configured to receive an instant messaging window switch instruction, switch an instant messaging window of a current contact to an instant messaging window of a next contact, and maintain the background of the instant messaging window of the next contact as the real-time image, so that the real-time image is placed behind the text of the instant messaging window of the next contact.

8. The apparatus according to claim 7, wherein the turn-on module is further configured to:
generate the real-time image turn-on instruction, when the background of the instant messaging window is a still background, when a touch instruction of a long press on the background of the instant messaging window is received.

9. The apparatus according to claim 7, wherein the turn-on module is further configured to:
generate the real-time image turn-on instruction, when the background of the instant messaging window is a still background, when a touch instruction of a click on a real-time image turn-on control is received.

10. The apparatus according to claim 7, further comprising a turn-off module, configured to receive a real-time image turn-off instruction inside the instant messaging window and turn off the camera; and
the background switch module is further configured to switch the background of the instant messaging window to a still background.

11. The apparatus according to claim 10, wherein the turn-off module is further configured to:
generate the real-time image turn-off instruction, when the background of the instant messaging window is the real-time image, when a touch instruction of a long press on the background of the instant messaging window is received, or when a touch instruction of a click on real-time image turn-off control is received.

12. The apparatus according to claim 7, further comprising a moving image display module, configured to switch the background of the instant messaging window to the real-time image, and at a same time display a switch-moving image.

13. A non-transitory computer readable storage medium storing one or more computer programs, the one or more programs comprising instructions, which, when executed by a terminal with one or more processors, cause the terminal to perform operations comprising:
providing a camera installed in the terminal;
receiving a real-time image turn-on instruction inside an instant messaging window indicated on the terminal, and turning on the camera according to the real-time image turn-on instruction;
receiving a real-time image acquired by the camera;
switching a background of the instant messaging window to the real-time image, the real-time image being placed behind a text of the instant messaging window,
receiving an instant messaging window switch instruction;
switching an instant messaging window of a current contact to an instant messaging window of a next contact; and
maintaining a background of the instant messaging window of the next contact as the real-time image, so that the real-time image is placed behind the text of the instant messaging window of the next contact.

14. The non-transitory computer readable storage medium according to claim 13, wherein the receiving a real-time image turn-on instruction inside an instant messaging window comprises:
generating the real-time image turn-on instruction, when the background of the instant messaging window is a still background, when a touch instruction of a long press on the background of the instant messaging window is received.

15. The non-transitory computer readable storage medium according to claim 13, wherein the receiving a real-time image turn-on instruction inside an instant messaging window comprises:
generating the real-time image turn-on instruction, when the background of the instant messaging window is a still background, when a touch instruction of a click on a real-time image turn-on control is received.

16. The non-transitory computer readable storage medium according to claim 13, wherein after the step of switching a background of the instant messaging window to the real-time image, so that the real-time image is placed behind a text of the instant messaging window, further comprising:
receiving a real-time image turn-off instruction inside the instant messaging window, turning off the camera, and switching the background of the instant messaging window to a still background.

17. The non-transitory computer readable storage medium according to claim 16, wherein the receiving a real-time image turn-off instruction inside the instant messaging window comprises:
generating the real-time image turn-off instruction, when the background of the instant messaging window is the real-time image, when a touch instruction of a long press on the background of the instant messaging window is received, or when a touch instruction of a click on real-time image turn-off control is received.

* * * * *